United States Patent Office

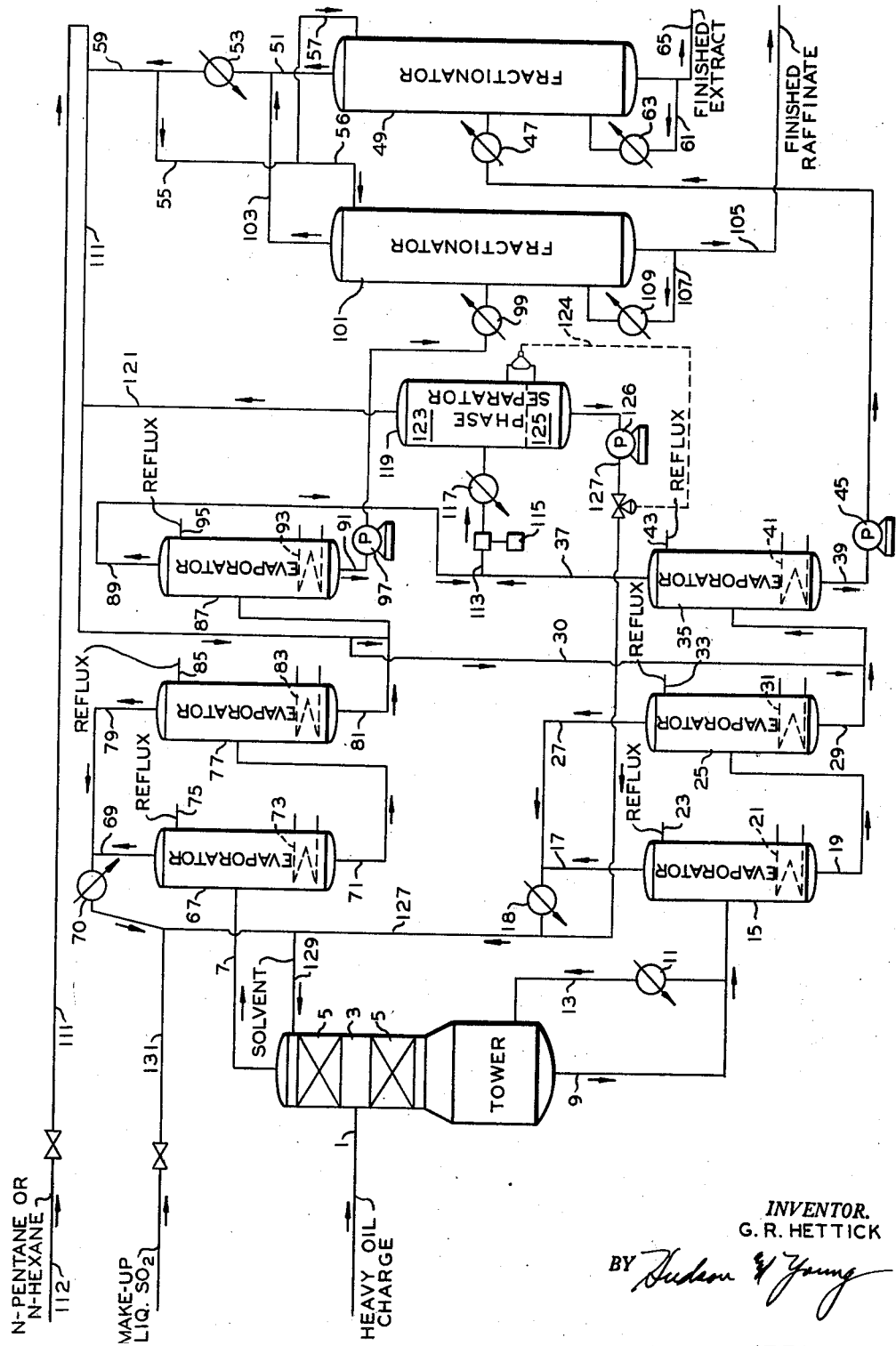

2,905,638
Patented Sept. 22, 1959

2,905,638

REMOVAL OF SULFUR DIOXIDE FROM OILS

George R. Hettick, Borger, Tex., assignor to Phillips Petroleum Company, a corporation of Delaware Application June 11, 1956, Serial No. 590,568

8 Claims. (Cl. 208—338)

This invention relates to removal of sulfur dioxide from high boiling oils. In one aspect it relates to removal of dissolved sulfur dioxide from high boiling oils, which form resins and/or gum-like materials or otherwise react chemically with sulfur dioxide at conventional and effective sulfur dioxide stripping temperatures, under such conditions as not to form said resins and/or gum-like materials.

Liquid sulfur dioxide extraction of high boiling oils, such as recycle oils having initial boiling points of 600° F. and above, is complicated by temperature limitations imposed by the reaction of sulfur dioxide with the oil at temperatures sufficiently high to remove the sulfur dioxide from the oils even under high vacuum. This problem is present in solvent extraction operations in which liquid sulfur dioxide is the solvent. Temperatures at which sulfur dioxide removal must be effected to avoid chemical reaction with oils are below about 300° F. Thus, the treatment of extract phases and raffinate phases for removal of final traces of sulfur dioxide exhibits the above-mentioned problem.

Prior art has attempted to solve this priblem by adding light or low boiling hydrocarbons to the liquid sulfur dioxide introduced into an extraction zone to assist ultimately in the removal by distillation and stripping of the final portion of the sulfur dioxide from the extract and raffinate oils. This light hydrocarbon adversely affects the extraction efficiency. The added light hydrocarbon in the extraction zone reduces the critical solution temperature of the solvent and oil. Since the optimum operation of such extraction zones is a few degrees below the critical solution temperature, with heavy oils being extracted, high viscosity operation and wax deposition sometimes occur. Such conditions obviously are not desired. Furthermore, the light hydrocarbon acts as a diluent for the liquid sulfur dioxide, and of course such diluent action is not desired.

An object of my invention is to provide a process for removing traces of dissolved sulfur dioxide from high boiling oils.

Another object of my invention is to provide a process for effectively removing sulfur dioxide from extract and raffinate oils produced in liquid sulfur dioxide extraction operations.

Still another object of my invention is to provide a method for such sulfur dioxide removal requiring only a minimum of additional equipment over that required in conventional extraction plants.

Yet another object of my invention is to provide a process for removing dissolved sulfur dioxide from high boiling oils withiut the formation of said resin and/or gum-like material.

Still other objects and advantages of my invention will be realized by those skilled in the art upon reading the following description which, taken with the attached drawing, forms a part of this specification.

I achieve these and other objects and advantages by distilling the high boiling oils containing solution sulfur dioxide in the presence of an added low boiling paraffinic hydrocarbon. Furthermore, I provide a process for reducing the sulfur dioxide content of hydrocarbon oils containing solution sulfur dioxide and reactive therewith at temperatures above about 300° F., said oils having an initial boiling point of about 600° F. and above, comprising distilling said oils in the presence of an added normally liquid paraffinic hydrocarbon boiling below about 300° F. at an absolute pressure of about 100 mm. mercury, removing distillate of said paraffinic hydrocarbon and sulfur dioxide, condensing the removed distillate, from the condensed distillate separating a liquid phase comprising said normally liquid paraffinic hydrocarbon and a minor proportion of solution sulfur dioxide, cycling said liquid phase into the distillation step as said normally liquid paraffinic hydrocarbon, and removing still bottoms from the distillation operation as the hydrocarbon oil of reduced sulfur dioxide content.

My invention effects sulfur dioxide removal from extract and raffinate oils substantially completely by the addition of the low boiling hydrocarbon as, for example, n-pentane, n-hexane, to raffinate and extract solutions prior to the sulfur dioxide removal step. Preferably I add the low boiling hydrocarbons to the final vacuum evaporation step. In conventional liquid sulfur dioxide extraction operations, three evaporation steps are sometimes employed to remove the sulfur dioxide from the raffinate and extraction oils and such evaporation steps are in some cases carried out at successive pressures of about about 100 p.s.i.g. (pounds per square inch gauge), 5 p.s.i.g., and 100 mm. (Hg) absolute pressure. In these evaporation steps temperatures above 300° F. cannot be employed with high boiling oils because of the danger of resin or gum formation. Even with the vacuum evaporation step, when employing a temperature therein not higher than 300° F., sulfur dioxide removal is not complete. According to my invention I add the light hydrocarbon to the vacuum evaporation step, and by employing temperatures in this step below about 300° F. when treating oils having an initial boiling point of 600° F. to 700° F. nearly complete removal of sulfur dioxide is accomplished. The addition of the light hydrocarbon accompanied by fractionation in the vacuum evaporator permits sulfur dioxide removal with an amount of light hydrocarbon remaining in the evaporator bottoms product providing the system pressure.

The total pressure of the system in the evaporator containing only oil and sulfur dioxide, that is in the absence of low boiling hydrocarbon, is equal to the partial pressure of the sulfur dioxide plus the partial pressure of the oil, the latter being very small and substantially negligible. Upon addition of the light hydrocarbon of my invention to the oil in the vacuum evaporator, the total pressure in the evaporator equals the partial pressure of the light added hydrocarbons plus the partial pressure of the sulfur dioxide plus the partial pressure of the high boiling oil. The partial pressure of the oil at about 300° F. in both these cases is very small and for all practical purposes is negligible. Thus, in the oil-sulfur dioxide system the total pressure of the system equals substantially the partial pressure of the sulfur dioxide. In the evaporator with added light hydrocarbons the system pressure is at substantially the partial pressure of the light hydrocarbon. In this latter case the partial pressure due to the presence of sulfur dioxide is negligible because an excess of light hydrocarbon is added for diluting the concentration of the sulfur dioxide and hence reducing its partial pressure. Thus the partial pressure in the vacuum evaporator of my invention with added hydrocarbon is substantially equal to the partial pressure of the low boiling hydrocarbon. In this manner substantially all of the sulfur dioxide is removed from the oil in the vacuum evaporator, and the oil removed therefrom as bottoms contains only a trace of sulfur dioxide.

Such a small amount of sulfur dioxide is then easily removed in a subsequent fractionation step employed mainly to remove the dissolved light hydrocarbon from the oil by fractionation without reaction of the sulfur dioxide with the oil. From this final fractionation step sulfur dioxide-free oil is obtained.

The drawing illustrates in diagrammatic form an arrangement of apparatus parts adapted for carrying out the process of my invention.

Referring now to the drawing in which a complete extraction operation employing my invention is illustrated, a heavy and high boiling oil to be extracted is introduced from a source, not shown, through a pipe 1 into a liquid-liquid extraction tower 3. Solvent, which in this case is liquid sulfur dioxide, is introduced into the tower through a pipe 129 from a source subsequently described. The extraction conditions as regards solvent-oil ratios, tower throughout temperature, etc. are well understood by those skilled in the liquid sulfur dioxide extraction art; and these conditions will not be herein given, for purposes of brevity. Reference numerals 5 identify liquid-liquid contact promoting packing material such as Raschig rings or other suitable contact material. Extract phase is removed from the extraction zone through a pipe 9 while the raffinate phase passes therefrom through a pipe 7.

A heat exchanger 11 is provided in an extract recycle pipe 13 for refluxing tower 3 and for temperature control. The extract phase not required for this refluxing is passed on into a first evaporator 15. In this evaporator heat for reboiling is provided by a heater 21 at a tower pressure of about 100 pounds per square inch gauge for removal of the major proportion of the sulfur dioxide. This removed sulfur dioxide is passed through a pipe 17, is condensed in a condenser 18 and is passed through a pipe 127 for recycling as solvent to the aforementioned solvent in pipe 129. Extract oil with an appreciable amount of remaining sulfur dioxide is removed through a pipe 19 and is passed through a second evaporator 25 which in this example is maintained at a pressure of about 5 pounds per square inch gauge with heat for evaporation of sulfur dioxide being supplied by a heater 31. Pipes 23 and 33 are provided for refluxing evaporators 15 and 25, respectively, when desired. Sulfur dioxide is removed from evaporator 25 through a pipe 27 and is combined with sulfur dioxide from pipe 17.

The bottoms oil from evaporator 25 containing only a small amount of solution sulfur dioxide is removed through a pipe 29 and is introduced into a vacuum evaporator 35. In this example this vacuum evaporator is operated at an absolute pressure of about 100 mm. of mercury. A low boiling paraffinic hydrocarbon such as, for example, n-hexane, is introduced into the evaporator from a pipe 30 from a source subsequently described. In the evaporator 35 a relatively large volume of low boiling hydrocarbon is added, and with heat supplied from a heater 41 the major portion of the solution sulfur dioxide is stripped from the oil. A pipe 43 is provided for passage of reflux to this column, if desired.

Bottoms oil for evaporator 35 containing light hydrocarbon in solution and only a trace of sulfur dioxide is passed through a pipe 39 by a pump 45 through a heater 47 into a fractionator 49. In fractionator 49 the concentration of the sulfur dioxide in the oil is so very small that substantially any desired stripping temperature can be employed in the stripping section to effect complete removal of the solution light hydrocarbon. This hydrocarbon removal step also removes the $SO_2$ to yield a $SO_2$-free oil. Bottoms oil, free of light hydrocarbon and sulfur dioxide, is removed from this fractionator through a pipe 65 with a portion of the oil being cycled through a pipe 61 and a heat exchanger 63 for providing reboiling heat to the fractionator. In this fractionator the concentration of the remaining sulfur dioxide is so small that substantially any desired reboiling temperature can be employed without danger of undue resin or gum formation through reaction of the sulfur dioxide and high boiling oil.

The overhead vaporous low boiling hydrocarbon containing a trace of sulfur dioxide is removed from fractionator 49 through a pipe 51 and is condensed in a condenser 53 and that portion of the condensate required for refluxing the fractionator is passed thereinto through pipes 55 and 57. That portion of the condensate from condenser 53 not required for this refluxing operation is passed on through a pipe 59 into a pipe 111, as described subsequently.

The light hydrocarbon vapors containing sulfur dioxide issuing from the vacuum evaporator 35 are passed through a pipe 37 and a pipe 113 to a vacuum pump 115. From this pump the vapors are chilled and condensed in a chiller 117 and condensate is passed into a liquid phase separating tank 119. When using normal hexane as the low boiling paraffinic hydrocarbon, I prefer to operate chiller 117 at such a temperature that condensate produced therein will be at a temperature of about —25° F. Thus a temperature of —25° F. is maintained in separator 119. At this temperature two liquid phases are produced. The bottom or heavy liquid phase 125 is liquid sulfur dioxide containing a minor amount of solution n-hexane. The light and upper phase 123 is a n-hexane rich phase containing only about 5 vol. percent of sulfur dioxide in solution at said temperature. This n-hexane phase containing said solution sulfur dioxide is withdrawn from separator 119 through a pipe 121 and is combined with the light hydrocarbon (n-hexane) condensate in pipe 111 and the combined stream is passed on through pipe 111 with a portion being passed through pipe 30 as the light hydrocarbon introduced into evaporator 35 as hereinbefore stated.

The operation of the raffinate-sulfur dioxide portion of the system is substantially like that just described for the extract portion. As previously stated, a raffinate phase is removed from this extraction tower 3 through pipe 7, and is introduced into an evaporator 67 maintained at about 100 pounds per square inch gauge pressure. Heat for sulfur dioxide removal in this evaporator is supplied by a heater 73 with reflux being provided through a pipe 75 as desired. Bottoms oil still containing solution sulfur dioxide is passed through a pipe 71 into a second evaporator 77, maintained at about 5 pounds per square inch gauge pressure. Heat for removal of sulfur dioxide in this evaporator is supplied by a heater 83, the evaporator being refluxed by liquid through from a pipe 85, if desired. Bottoms oil containing only a very small concentration of sulfur dioxide is passed through a pipe 81 into a vacuum evaporator 87 maintained at an absolute pressure of about 100 mm. of mercury. Sufficient heat is provided from a heater 93 to maintain the temperature of the oil in this evaporator below about 300° F. with reflux being provided from a pipe 95, if desired. A portion of the light hydrocarbon (n-hexane) condensate stream from pipe 111 is passed through pipe 81 into this vacuum evaporator for removal of the sulfur dioxide in a manner similar to that described in relation to evaporator 35. Light hydrocarbon containing sulfur dioxide is removed from evaporator 87 through an overhead pipe 89, and this vaporous material is combined with vaporous material of a similar composition from pipe 37 for passage through pipe 113, vacuum compressor 115, chiller 117, and finally into the phase separator 119.

Oil containing solution light hydrocarbon (n-hexane) and only a very small trace of sulfur dioxide is removed from evaporator 87 through a pipe 91 and is transferred by a pump 97 through a heater 99 into a fractionator 101. In this fractionator solution light hydrocarbon and the final trace of sulfur dioxide are removed from the raffinate oil, the overhead vapors being passed through pipe 103 to be combined with the overhead vapors of similar composition from fractionator 49. A portion of the condensate produced in condenser 53 is passed through pipes 55 and 56 for refluxing fractionator 101. Bottoms raffinate oil from fractionator 101 is removed through a pipe 105 and the portion thereof required for reboiling the column is bypassed through a pipe 107, a heater 109 and reintroduced into the fractionator. That portion of the oil not required for reboiling is removed from the system through pipe 105 as the raffinate product of the process.

Sulfur dioxide removed from raffinate oil in evaporators 67 and 77 is passed through pipes 69 and 79, respectively, and combined, and the combined stream is condensed in a condenser 70 and the condensate liquid sulfur dioxide is passed on through pipe 129 as a portion of the solvent for the extraction zone 3. Makeup liquid sulfur dioxide as required is supplied from a source, not shown, through a pipe 131. Low boiling hydrocarbon for makeup purposes is supplied to the system also from a source, not shown, through a pipe 112.

The liquid sulfur dioxide phase 125 containing a minor concentration of light hydrocarbon is removed from the phase separator 119 through pipe 127 under the influence of a pump 126 and this liquid sulfur dioxide is combined with that recovered from the evaporators 15, 25, 67, and 77 for recycling into the extraction zone. The liquid sulfur dioxide removal from this separator is controlled by a liquid level controller 124. Also, because the volume of this separator is so very small, the small concentration of dissolved paraffinic hydrocarbon exerts substantially no adverse influence on the extraction operation in extractor 3.

The choice of a light hydrocarbon for use in my system is dictated by the desired conditions of operation or the operating conditions are modified to fit the chosen light hydrocarbon. For example, the upper boiling point limit of the hydrocarbon can be defined under some conditions as about 300° F. at the pressure maintained in evaporators 35 and 87. Furthermore, this hydrocarbon must boil at a temperature below the initial boiling point of the extract oil and the raffinate oil under the pressure conditions maintained in evaporators 35 and 87 so that the paraffinic hydrocarbon will be easily removed from the extract and raffinate oils in these evaporators. The lower limit of boiling point of the light hydrocarbon is such that the light hydrocarbon must be condensed to a liquid in chiller 117 so as to retain in solution only a very minor concentration of sulfur dioxide for reintroduction into the vacuum evaporators. It is obvious that if the light hydrocarbon phase in separator 119 were a gas phase the concentration of sulfur dioxide in the gas phase could be quite large because of the miscibility of gases in one another. The proper distribution of sulfur dioxide between the phases in the separator is due to the small solubility of sulfur dioxide in liquid paraffinic hydrocarbon and to the small solubility of paraffinic hydrocarbon in liquid sulfur dioxide at the low temperature maintained in separator 119.

When using light hyrdocarbons in the range of n-hexane and n-heptane at a separator temperature of about −25° F. and about 5 volume percent of sulfur dioxide dissolves in the liquid hydrocarbon phase.

While a temperature of −25° F. was hereinbefore disclosed as being obtained in chiller 117 and maintained in the phase separator 119 (at a pressure of 5 pounds per square inch absolute) when using n-hexane as the paraffinic hydrocarbon, it is obvious that a lower temperature is required when using n-pentane as the paraffinic hydrocarbon. This lower temperature is about −40° F. with a pressure of about 3 pounds per square inch absolute in separator 119. If n-butane and n-propane were used as the lighter hydrocarbon still lower temperatures would be required. Consequently, if paraffinic hydrocarbon higher boiling than hexane is used, higher temperatures can be employed in separator 119 provided the solubility of sulfur dioxide in the liquid hydrocarbon phase is sufficiently low to give the proper stripping of the sulfur dioxide in evaporators 35 and 87. Thus, the temperature maintained in separator 119 is actually defined by two conditions, one being that the hydrocarbon phase must be liquid and the other that the solubility of sulfur dioxide in the liquid hydrocarbon phase must be appropriately small.

By this latter term I mean the solubility of sulfur dioxide in the paraffinic hydrocarbon is sufficiently low or small that the concentration of the sulfur dioxide in the hydrocarbon phase in the phase separator 119 is sufficiently small that upon addition of this hydrocarbon phase to the vacuum distillation step only a trace of sulfur dioxide remains in the vacuum distillation still bottoms and this trace can be removed using substantially any desired temperature in a final distillation step employed mainly for removal of the added paraffinic hydrocarbon without or substantially without reaction of sulfur dioxide with recycle oil constituents.

The operation according to my invention includes a solvent extraction process comprising liquid-liquid extracting a recycle oil with liquid sulfur dioxide thereby producing an extract phase and a raffinate phase, said phases containing solution sulfur dioxide, separately distilling said phases at a temperature below which chemical reaction occurs between constituents of said recycle oil and sulfur dioxide to remove the major portion of said solution sulfur dioxide, further separately distilling at reduced pressures the still bottoms from the first mentioned distilling operations at a temperature below which chemical reaction occurs between constituents of said recycle oil and sulfur dioxide in the presence of added paraffinic hydrocarbon in which sulfur dioxide is soluble only to a small extent in the liquid phase, withdrawing overhead distillates from the second separate distilling operations and condensing same to produce a first phase predominating in said paraffinic hydrocarbon, and a second phase predominating in liquid sulfur dioxide, passing a portion of said first phase predominating in said paraffinic hydrocarbon to the further separate distilling operations as said added paraffinic hydrocarbon, condensing sulfur dioxide from the first mentioned distillation steps and returning same to the extraction operation, returning said second phase to the extraction operation, further separately distilling the bottoms from the second separate distilling operations at temperatures sufficiently high to remove the remaining added paraffinic hydrocarbon and final traces of sulfur dioxide and removing bottoms from the latter distilling operations as the final extract and raffinate products of the process.

While I have disclosed my sulfur dioxide removal process as applied to high boiling raffinate and extract oils it is also used for separating sulfur dioxide from high boiling oils prior to solvent extraction with sulfur dioxide, and for separating $SO_2$ from such other high boiling hydrocarbon oils which react with $SO_2$ to form gums and resins at temperatures normally required for stripping solution $SO_2$ from the oils.

In the evaporators 15, 67 and 25, 77, as well as in the vacuum evaporators 35, 87, temperatures above about 300° F. are not used because of the formation of resins and/or gum-like materials.

Iso-paraffin hydrocarbons and cycloparaffinic hydrocarbons having the required boiling points, solubilities, etc., are used in my process as well as normal paraffin hydrocarbons.

While certain embodiments of the invention have been

I claim:

1. A process for reducing the sulfur dioxide content of a feed hydrocarbon oil containing solution sulfur dioxide, said sulfur dioxide being reactive with said oil at temperatures above about 300° F., said oil having an initial boiling point above about 600° F., comprising the steps of distilling said oil at a subatmospheric pressure in the presence of an added normally liquid paraffinic hydrocarbon boiling below about 300° F. thereby producing distillate and still bottoms, removing said distillate of said paraffinic hydrocarbon and sulfur dioxide, condensing the distillate thereby producing condensate, from the condensate separating a liquid phase comprising said normally liquid paraffinic hydrocarbon and a minor proportion of solution sulfur dioxide, cycling said liquid phase into the distilling step as said normally liquid paraffinic hydrocarbon, and removing said still bottoms as a hydrocarbon oil of reduced sulfur dioxide content.

2. The process of claim 1 wherein the feed hydrocarbon oil is a cycle oil and said paraffinic hydrocarbon is n-pentane.

3. The process of claim 2 wherein said feed hydrocarbon oil is an extract oil containing solution sulfur dioxide resulting from a liquid sulfur dioxide-oil extraction operation, said subatmospheric pressure being an absolute pressure of about 100 mm. of mercury.

4. The process of claim 2 wherein said feed hydrocarbon oil is a raffinite oil containing solution sulfur dioxide resulting from a liquid sulfur dioxide-oil extraction operation, said subatmospheric pressure being an absolute pressure of about 100 mm. of mercury.

5. A solvent extraction process comprising liquid-liquid extracting a cycle oil having a minimum initial boiling point above about 600° F. with liquid sulfur dioxide thereby producing an extract phase and a raffinate phase, said phases containing solution sulfur dioxide, distilling one of said phases at a temperature below which reaction between sulfur dioxide and cycle oil occurs to remove the major portion of said solution sulfur dioxide, further distilling at reduced pressure of less than atmospheric the still bottoms from the first mentioned distilling operation at said temperature below which chemical reaction between sulfur dioxide and cycle oil occurs in the presence of added paraffinic hydrocarbon in which sulfur dioxide is soluble only to a small extent in the liquid phase and boiling at a temperature below the initial boiling point of said cycle oil, withdrawing an overhead distillate from the second distilling operation, condensing the overhead distillate to produce a first phase predominating in said paraffinic hydrocarbon and a second phase predominating the sulfur dioxide, passing at least a portion of the first phase to the further distilling operation as said added paraffinic hydrocarbon, condensing sulfur dioxide from the first mentioned distillation step and returning same to the extraction operation, returning said second phase to the extraction operation, further distilling the bottoms of the second distilling operation at a temperature sufficiently high to remove the remaining added paraffinic hydrocarbon and final trace of sulfur dioxide and removing bottoms from the latter distilling operation as the final product of the process.

6. The process of claim 5 wherein the feed hydrocarbon oil is a cycle oil.

7. The process of claim 5 wherein said added normally liquid paraffinic hydrocarbon is normal pentane.

8. The process of claim 5 wherein the added normally liquid paraffinic hydrocarbon is an isoparaffin hydrocarbon.

References Cited in the file of this patent

UNITED STATES PATENTS

| | | |
|---|---|---|
| 1,776,753 | Edeleanu | Sept. 23, 1930 |
| 1,913,658 | Cattaneo | June 13, 1933 |
| 2,024,476 | Rutherford | Dec. 17, 1935 |
| 2,073,517 | Fitzsimons et al. | Mar. 9, 1937 |
| 2,186,524 | Frey et al. | Jan. 9, 1940 |
| 2,717,229 | Findlay | Sept. 6, 1955 |
| 2,724,682 | Shelton et al. | Nov. 22, 1955 |
| 2,739,925 | Arnold et al. | Mar. 27, 1956 |
| 2,777,800 | Mitchell et al. | Jan. 15, 1957 |
| 2,779,709 | Dale et al. | Jan. 29, 1957 |
| 2,816,859 | Hoppe | Dec. 17, 1957 |